UNITED STATES PATENT OFFICE.

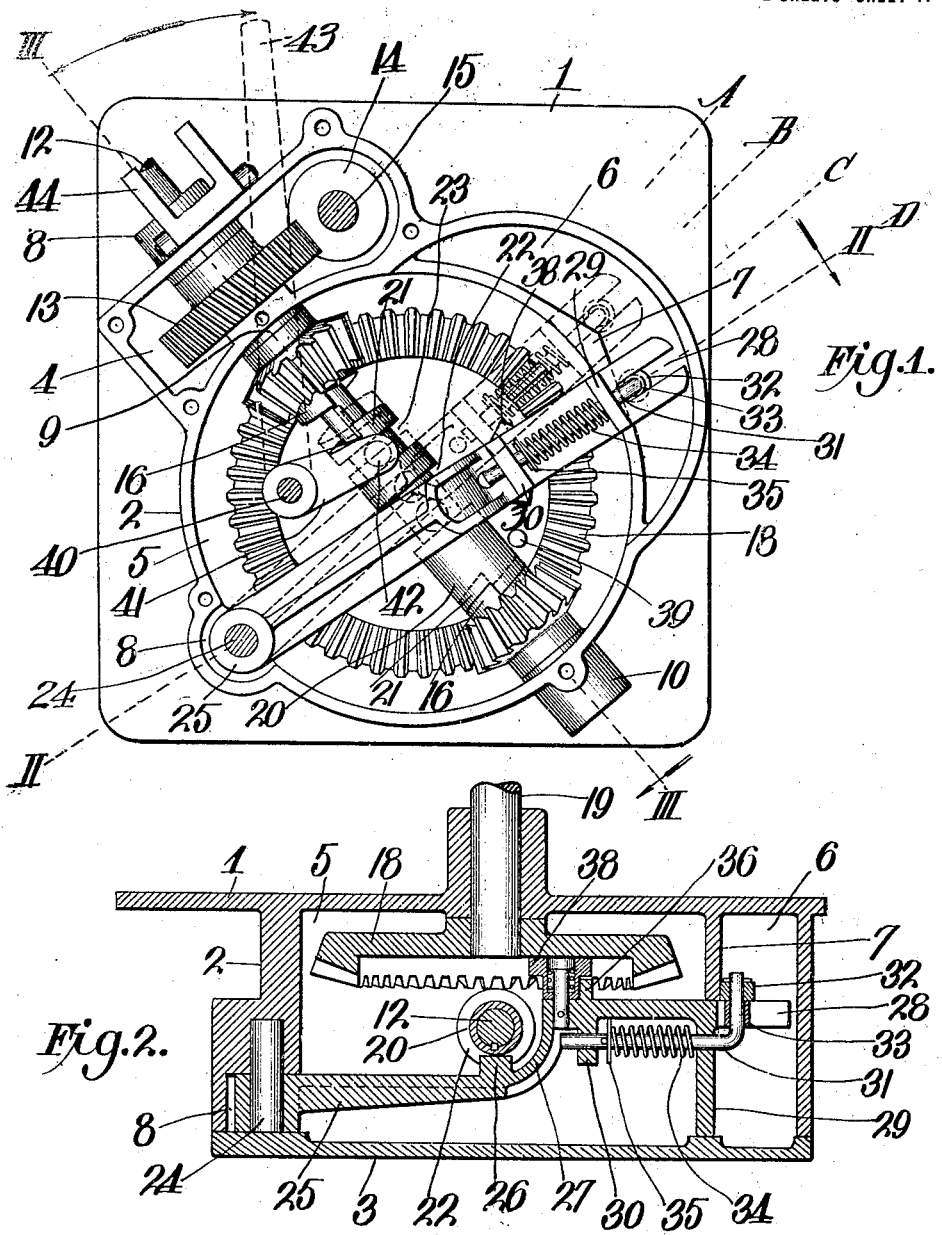

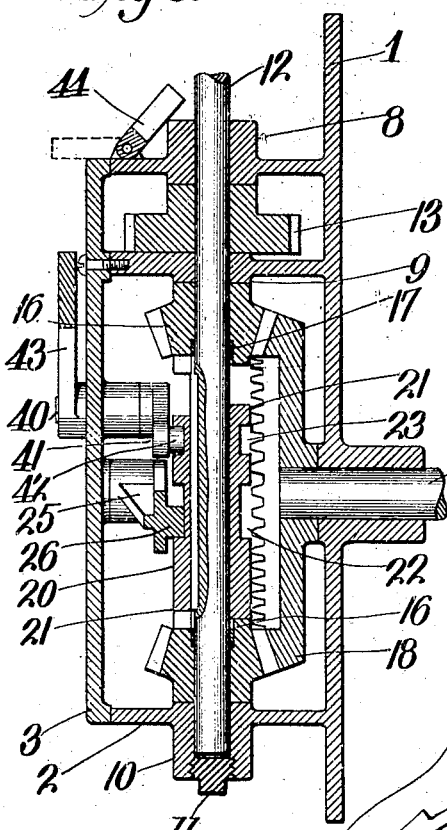
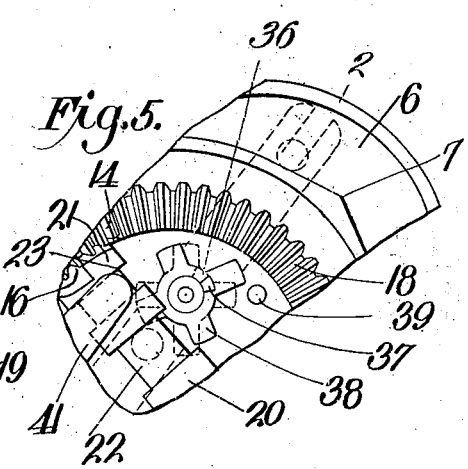
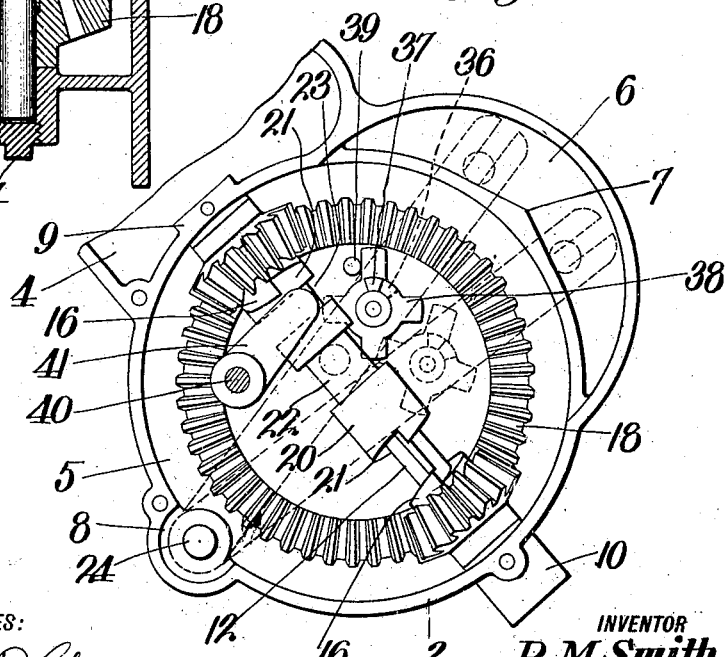

RUSSELL M. SMITH, OF KANSAS CITY, MISSOURI.

REVERSING-GEARING.

1,189,500.  Specification of Letters Patent.  Patented July 4, 1916.

Application filed June 14, 1915. Serial No. 34,117.

*To all whom it may concern:*

Be it known that I, RUSSELL M. SMITH, a citizen of the United States, residing at Kansas City, in the county of Jackson and State of Missouri, have invented certain new and useful Improvements in Reversing-Gearing, of which the following is a specification.

This invention relates to reversing gearing of that type embodying a continuously driven member and an oscillating member actuated by the driven member, through certain instrumentalities, to make a fixed number of revolutions in one direction and then a corresponding number of revolutions in the opposite direction, and my object is to produce an efficient gearing of the character outlined, possessing the desirable features of simplicity, strength, durability and compactness of construction, and in addition thereto, the property of operating under minimum power expenditure and without noticeable or noisy clatter or jar as reverse actions of the oscillating member occur.

With this object in view, the invention consists in certain novel and peculiar features of construction and combinations of parts as hereinafter described and claimed; and in order that it may be fully understood, reference is to be had to the accompanying drawings, in which:—

Figure 1, is a face view of a reversing gearing embodying the invention, the cover of the housing being omitted. Fig. 2, is a section taken on the line II—II of Fig. 1, but with the housing cover in position. Fig. 3, is a section taken on the line III—III of Fig. 1, but with the housing cover in position. Fig. 4, is a view similar to Fig. 1, but with the shift lever omitted to disclose parts otherwise not clearly shown. Fig. 5, is a fragmentary face view to disclose certain parts in a different operative relation from that which they occupy in other figures.

Referring now to the drawings in which like parts are correspondingly identified, 1 is the back, 2 the generally round body or wall, and 3 the cover or face-plate of the housing for the gearing. The housing is partitioned to form chambers 4, 5, and 6, the partition between chambers 5 and 6, extending concentrically of the center of chamber 5, and having formed on its side exterior to said chamber a double cam 7. The said partition is also of less depth than the wall or body of the housing for a reason which hereinafter appears. The housing wall or body is offset to provide a recess 8, diametrically opposite the cam, and at diametrically-opposite points in a plane at right angles to that of the cam and recess, is formed with a bearing 9, and a bearing 10, the latter occurring at a low point of the wall or body and being closed by a plug 11, needed to close chamber 5 against the leakage therefrom of lubricant, such as solid oil or grease. Journaled in bearings 9 and 10, is a shaft 12, in continuous operation as long as the machine of which the gearing forms a part, is in action, and said shaft is equipped within chamber 4, with a worm gear 13, intergeared with a worm 14, on a shaft 15, adapted to be belted or otherwise connected to a motor, not shown. Journaled on shaft 12, is an upper and a lower clutch-gear 16, a collar 17 holding the upper gear at the proper elevation. Clutch-gear 16 intermesh with a large gear wheel 18, upon and adapted to operate a shaft 19, journaled near one end in the housing and adapted for the operation of a washing machine drum or the like. Keyed to slide upon and rotate with the shaft 12, is a sliding member or sleeve 20, provided at each end with a clutch-face 21, and between its ends with a central annular groove 22, and another annular groove 23.

Pivoted on a stud 24, in recess 8, is a clutch-shift lever 25, provided with a round stud 26, engaging the annular groove 22, and curved around shaft 12 at 27, and terminating in an extension 28, projecting into the chamber 6, and bearing and adapted to slide upon the partition formed with the said double cam. The lever has a forwardly projecting arm 29, which slides on the cover 3, the latter with the partition thus guarding against outward and inward springing movement of the lever when the work of shifting the clutch is imposed on the lever. The lever is provided also with a second arm 30, and fitting slidingly in said arms is a rod 31, terminating at its outer or free end in a rearwardly extending portion equipped with a roller 32 for travel upon the double cam, a second roller, 33, fitting in the slotted outer end of the lever extension 28, to prevent rotatable movement of the rod. An expansion spring 34 mounted on the rod, bears at its outer end against arm 29 and at its inner end upon a collar 35 on the rod to hold the roller 32 with considerable pressure upon the cam, the said spring and the slotted portion of the lever coöperating in maintaining the roller in proper tracking relation with the cam.

Projecting rearward from the lever is a lug 36, for engagement periodically by a similar lug 37 of a four-armed star wheel 38, journaled on the lever. One of said arms is of such length that the stud 39 of the wheel 18 cannot pass it while the remainder of the arms are adapted to be successively engaged and passed by said stud in successive revolutions of said wheel. The arrangement is such that the stud in the revolutions of said wheel 18 imparts three intermittent rotative movements to the star wheel, and thereby shifts the lug thereof from contact with one side of the lever lug 36 to contact with the opposite side of said lug. Near the end of the fourth revolution of the wheel 18, the stud strikes the long arm of the star wheel and operates the lever 25 instead of turning the star wheel, because the lug 36 of the lever is in the path of movement of the lug of the star wheel. The movement thus imparted to the lever is from the position, lines A to C or D to B Fig. 1, accordingly as the wheel 18 is rotated clockwise or counter-clockwise, the lever in such movements unclutching the slidable member 20 from the upper clutch gear 16 and the lower clutch gear 16 respectively. In each of such movements the roller 32 travels upward toward and beyond the crest of the cam 7, which thus serves to compress or tension the spring 34, so that it shall be capable of exerting sufficient power to cause the roller 32 to travel downward on the cam and thus continue the operation of the lever until it has shifted the clutch member 20 into engagement with the clutch gear at the opposite side of the wheel 18, from that occupied by the clutch gear from which the clutch member was previously withdrawn. It will be noted in this connection, that as the unclutching action occurs, the motion of wheel 18 ceases and that the continued movement of the lever spaces it from the stud as indicated in Fig. 5. Extending pivotally through the cover, is a pin 40 provided with a crank 41, equipped with a lug 42, engaging the groove 23 of clutch member 20. The pin is provided externally of the housing with a lever 43, adapted to act as a counter-balance for lever 25, by swinging toward a vertical position when the lever 25 swings downward and reversely when lever 25 swings upward. Lever 43 thus aids spring 34 to "lift" lever 25 and the clutch-member 20 and opposes said spring as the latter performs its easier work of imparting downward movement to lever 25 and the clutch-member, to prevent undesirable forcible contact between the clutch member 20 and the lower clutch wheel, and the consequent production of noise and noticeable shock or jar.

When it is desired to hold the clutch member 20 in a neutral position, that is out of engagement with both clutch wheels, the lever 43 is shifted to a position indicated by the junction of two arrows, Fig. 1, in which position it may be secured by the U-shaped catch 44, pivoted to the housing, said catch being swung to the operative position shown by dotted lines Fig. 3, so that its legs shall be disposed at opposite sides of the lever.

Assuming that the worm 14 is rotating counterclockwise, and that the slidable clutch is engaged with the upper clutch gear 16, it will be apparent that the crown gear 18 is being driven clockwise. By reference to Fig. 4, it will be seen that stud 39 has engaged the long arm of the star wheel and is therefore about to operate the lever 25 because the lug 37 of the wheel is abutting against the lug 36 of the lever, the movement of the lever under the pressure of the stud 39 being from dotted position A toward the crest of the cam 7. In this action the lever attains position B before the stud 26 begins to slide the clutch member, the further movement of the clutch member being under pressure of stud 39 until the roller 39 rides over the crest of the cam and attains a position slightly further below the crest, than it is shown in dotted lines Fig. 1, above the crest, that is, until it attains position C. As it attains the position mentioned, the clutch member is withdrawn from engagement with the clutch gear 14 and the crown gear 18 stops, the lever movement, however, continuing under the power of the compressed spring 34 until the lever attains the position D shown by full lines, Fig. 1, and dotted lines Fig. 4, in which position it will be noted, the clutch member 20 is in engagement with the lower clutch wheel 16 and that the latter instantly begins to rotate the wheel in the opposite direction to that in which it formerly turned.

As the wheel completes a revolution counter-clockwise, the stud 39 passes the lever and incidentally rotates the star wheel about a quarter revolution, through engaging and pushing out of its path one of the short arms of such wheel. As the wheel 18 completes a second revolution, the stud rotates the star wheel a second step by engaging and pushing aside the second arm of the wheel, the said arm having been moved into the orbit of the stud as the first movement of the star wheel occurred.

I claim:

1. In reversing gearing, the combination of a driven shaft, a pair of clutch-gears journaled thereon, a gear wheel meshing at opposite sides of its axis with said clutch gears and provided with a stud, a clutch member slidable on and rotatable with the said shaft and engaging one of said clutch gears, a lever yoked to the slidable clutch member and provided with a lug, movable means carried by the lever, a double cam in the path of movement of said means, a star-wheel journaled on the lever and provided with a lug and adapted to be periodically turned a partial revolution by the successive engagement of said stud with its arms to cause its lug in one of its intermittent movements to apply pressure on the lever and operate the same until the said means passes beyond the crest of the cam and the clutch member is disengaged from the said clutch gear, and means to continue the movement of the lever from the point mentioned to effect engagement of the slidable clutch member with the other clutch gear and thereby effect reverse movement of the stud-carrying wheel.

2. In reversing gearing, the combination of a driven shaft, a pair of clutch gears journaled thereon, a gear wheel meshing at opposite sides of its axis with said clutch gears and provided with a stud, a clutch member slidable on and rotatable with the said shaft and engaging one of said clutch gears, a lever yoked to the slidable clutch member and provided with a lug, movable means carried by the lever, a double cam in the path of movement of said means, a star-wheel journaled on the lever and provided with a lug and adapted to be periodically turned a partial revolution by the successive engagement of said stud with its arms to cause its lug in one of its intermittent movements to apply pressure on the lever and operate the same until the said means passes beyond the crest of the cam and the clutch member is disengaged from the said clutch gear, and a spring to be tensioned by upward movement of the said movable means toward the crest of the cam to exert force to continue the movement of the lever after the crest of the cam has been passed and thereby effect engagement of the clutch member with the other clutch gear.

3. In reversing gearing, the combination of a driven shaft, a pair of clutch gears journaled thereon, a gear wheel meshing at opposite sides of its axis with said clutch gears and provided with a stud, a clutch member slidable on and rotatable with the driven shaft and engaging one of the clutch gears, a lever yoked to the slidable clutch member, movable means carried by the lever, a double cam in the path of movement of said means, means adapted periodically to be caused by the said stud to apply pressure on the lever to operate the same upward on the cam along one side thereof and beyond the crest of the same to effect disengagement between the clutch member and said clutch gear, means to continue the movement of the lever on the cam to effect engagement of the slidable clutch member with the other clutch gear to effect reverse movement of the said stud-carrying wheel, and means connected to the slidable clutch member for yieldingly resisting downward movement thereof and assisting in the upward movement thereof.

4. In reversing gearing, the combination of a driven shaft, a pair of clutch gears journaled thereon, a gear wheel meshing at opposite sides of its axis with said clutch gears and provided with a stud, a clutch member slidable on and rotatable with the driven shaft and engaging one of the clutch gears, a lever yoked to the slidable clutch member, movable means carried by the lever, a double cam in the path of movement of said means, means adapted periodically to be caused by the said stud to apply pressure on the lever to operate the same upward on the cam along one side thereof and beyond the crest of the same to effect disengagement between the clutch member and said clutch gear, means to continue the movement of the lever on the cam to effect engagement of the slidable clutch member with the other clutch gear to effect reverse movement of the said stud-carrying wheel, a second lever loosely connected to the slidable clutch member and adapted for resisting downward movement thereof and assisting in the upward movement thereof and for being manually operated to adjust the clutch member to neutral or inoperative position, and means for holding said second lever against movement while the clutch member occupies its neutral position.

5. The combination of a driven shaft, clutch gears journaled thereon, a clutch member slidable on and rotatable with the driven shaft, a lever to slide the clutch member, provided with a lug, a star wheel journaled on the lever and having a lug, one of the arms on the star wheel being longer than the others, a gear wheel meshing with the clutch gears and provided with a stud adapted in successive rotations of the said wheel, to impart step-by-step rotation to the star wheel by successively engaging with short arms thereof, said stud being adapted to pass by the short arms after engagement therewith and by engagement with the long arm, cause the lug of the star wheel to apply pressure on the lug of the lever to cause the same to swing and withdraw the clutch member from engagement with one of the clutch gears and move it toward the other clutch gear, and coöperating means for yieldingly resisting said movement of the lever until after the unclutching operation is nearly completed and then continuing and accelerating such movement to complete such unclutching movement and cause the clutch member to engage the other clutch gear to cause the same to reverse the operation of the stud-carrying gear wheel.

6. In reversing gearing, a wheel provided with a stud, a clutch-gear engaging the stud-carrying wheel, a lever provided with a lug, a star wheel journaled on the lever and provided with a lug and a plurality of arms for successive engagement by the stud in successive revolutions of the said wheel, to impart step-by-step rotation to the star-wheel until its said lug engages the lug of the lever; said star-wheel having a long arm for engagement by said stud after the lugs are engaged to transmit power to operate the lever, a second clutch-gear engaging said stud-carrying wheel at the opposite side of the axis of the same from the first clutch-gear, a clutch member intermediate said clutch gears and means whereby the operation of said lever shall move the clutch member out of engagement with the first-named clutch-gear and into engagement with the last-named clutch-gear to effect reverse rotation of the stud-carrying wheel, reverse intermittent movement of the star-wheel and reverse movement of the clutch member.

In testimony whereof, I affix my signature, in the presence of two witnesses.

RUSSELL M. SMITH.

Witnesses:
 DENIS J. DOWNEY,
 G. Y. THORPE.